US009298993B2

(12) United States Patent
Fan et al.

(10) Patent No.: US 9,298,993 B2
(45) Date of Patent: Mar. 29, 2016

(54) ON-STREET VEHICLE PARKING OCCUPANCY ESTIMATION VIA CURB DETECTION

(71) Applicant: Xerox Corporation, Norwalk, CT (US)

(72) Inventors: Zhigang Fan, Webster, NY (US); Orhan Bulan, Henrietta, NY (US)

(73) Assignee: Xerox Corporation, Norwalk, CT (US)

( * ) Notice: Subject to any disclaimer, the term of this patent is extended or adjusted under 35 U.S.C. 154(b) by 142 days.

(21) Appl. No.: 14/192,174

(22) Filed: Feb. 27, 2014

(65) Prior Publication Data

US 2015/0242695 A1   Aug. 27, 2015

(51) Int. Cl.
G06K 9/00 (2006.01)
G06K 9/62 (2006.01)
G06T 7/00 (2006.01)
G08G 1/14 (2006.01)

(52) U.S. Cl.
CPC .......... *G06K 9/00812* (2013.01); *G06K 9/628* (2013.01); *G06K 9/6218* (2013.01); *G06K 9/6227* (2013.01); *G06T 7/0042* (2013.01); *G08G 1/14* (2013.01); *G06T 2207/10004* (2013.01); *G06T 2207/10016* (2013.01); *G06T 2207/20081* (2013.01); *G06T 2207/30264* (2013.01)

(58) Field of Classification Search
CPC combination set(s) only.
See application file for complete search history.

(56) References Cited

U.S. PATENT DOCUMENTS

| 6,081,206 A * | 6/2000 | Kielland | G06Q 30/0284 194/902 |
|---|---|---|---|
| 6,285,279 B1 | 9/2001 | Yamazaki | |
| 6,285,297 B1 * | 9/2001 | Ball | G08G 1/14 340/932.2 |
| 6,747,687 B1 | 6/2004 | Alves | |
| 7,123,166 B1 * | 10/2006 | Haynes | G08G 1/14 340/932.2 |
| 7,667,581 B2 * | 2/2010 | Fujimoto | G06K 9/00369 340/425.5 |
| 7,688,225 B1 * | 3/2010 | Haynes | G08G 1/14 340/932.2 |
| 8,120,513 B2 | 2/2012 | Ioli | |
| 8,229,618 B2 * | 7/2012 | Tolstedt | G05D 1/0212 701/23 |
| 8,560,175 B2 * | 10/2013 | Bammert | B62D 15/028 701/301 |
| 8,712,103 B2 * | 4/2014 | Focke | B60R 1/00 382/104 |
| 8,737,690 B2 * | 5/2014 | Bulan | G06K 9/00785 340/903 |
| 8,825,292 B2 * | 9/2014 | Tseng | B60G 17/015 280/5.514 |
| 8,957,786 B2 * | 2/2015 | Stempnik | G08G 1/14 180/167 |
| 2003/0076417 A1 | 4/2003 | Thomas et al. | |
| 2011/0063097 A1 * | 3/2011 | Naka | G06K 9/00208 340/435 |

(Continued)

OTHER PUBLICATIONS

Alibaba.com, Ultrasonic Parking Sensor, printed Feb. 27, 2014, 4 pages, http://www.alibaba.com/product-gs/373281312/Ultrasonic_Parking_Sensor.html.

(Continued)

*Primary Examiner* — Anand Bhatnagar
(74) *Attorney, Agent, or Firm* — Kevin Soules; Kermit D. Lopez; Luis M. Ortiz

(57) ABSTRACT

A method and system for on-street vehicle parking occupancy estimation via curb detection comprises training a computer system to identify a curb, evaluating image data of the region of interest to determine a region wherein a curb is visible in said region of interest, and estimating a parking occupancy of said region of interest according to said region where said curb is visible.

17 Claims, 8 Drawing Sheets

(56) References Cited

U.S. PATENT DOCUMENTS

| | | |
|---|---|---|
| 2012/0007983 A1 | 1/2012 | Welch |
| 2012/0263352 A1 | 10/2012 | Fan et al. |
| 2012/0285790 A1* | 11/2012 | Jones .................. G07B 15/02 194/217 |
| 2013/0016877 A1* | 1/2013 | Feris .................. G06K 9/00771 382/103 |
| 2013/0057686 A1 | 3/2013 | Genc et al. |
| 2013/0265419 A1 | 10/2013 | Bulan et al. |
| 2013/0265423 A1 | 10/2013 | Bernal et al. |
| 2013/0265426 A1 | 10/2013 | Fan et al. |
| 2013/0266185 A1 | 10/2013 | Bulan et al. |
| 2013/0266187 A1 | 10/2013 | Bulan et al. |
| 2013/0266188 A1 | 10/2013 | Bulan et al. |
| 2014/0218527 A1* | 8/2014 | Subramanya .......... G08G 1/143 348/148 |

OTHER PUBLICATIONS

FYBR—Better Communities, printed Feb. 27, 2014, 3 pages, http://streetsmarttechnology.com.

NYC Parking Tickets | NYC Parking Violation, Park It Guides, printed Feb. 27, 2014, 3 pages, http://parkitnyc.com/parking-nyc/nyc-parking-tickets/.

Search Report for GB1502665.1 dated Aug. 11, 2015.

\* cited by examiner

ON-STREET VEHICLE PARKING OCCUPANCY ESTIMATION VIA CURB DETECTION

FIELD OF THE INVENTION

Embodiments are generally related to the field of video-based detection. Embodiments are also related to methods and systems for video-based parking detection. Embodiments are further related to methods and systems for estimating parking occupancy using curb detection.

BACKGROUND

Motion detection is an important component of automated video analytics. In video based on-street vehicle parking applications, cameras are often installed to monitor vehicles. In some cases it is important to identify the available parking capacity of a scene of interest. In such cases, video based parking applications have been developed to determine parking occupancy.

However, existing video-based methods for determining parking occupancy generally rely on vehicle detection. This presents a challenging problem because detecting vehicles is difficult. For example, algorithms used for vehicle detection are notoriously prone to poor performance because vehicles come in various colors, shapes, sizes, types, makes, and models. Additionally, varying weather and illumination conditions can affect the robustness of known vehicle detection means. As a result, vehicle detection often requires complicated algorithms and costly computer cycles, both in terms of time and money.

These and other problems associated with vehicle detection have created a need for improved methods and systems for video-based, on-street parking occupancy determinations.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method and system for object detection.

It is another aspect of the disclosed embodiments to provide a method and system for video based on-street curb detection.

It is yet another aspect of the disclosed embodiments to provide an enhanced method and system for robust and computationally efficient, on-street parking occupancy estimations via curb detection.

The aforementioned aspects and other objectives and advantages can now be achieved as described herein. A method and system for on-street vehicle parking occupancy estimation via curb detection comprises training a computer system to identify a curb, evaluating image data of the region of interest to determine a region where a curb is visible in the region of interest, and estimating a parking occupancy of the region of interest according to the region where the curb is visible.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
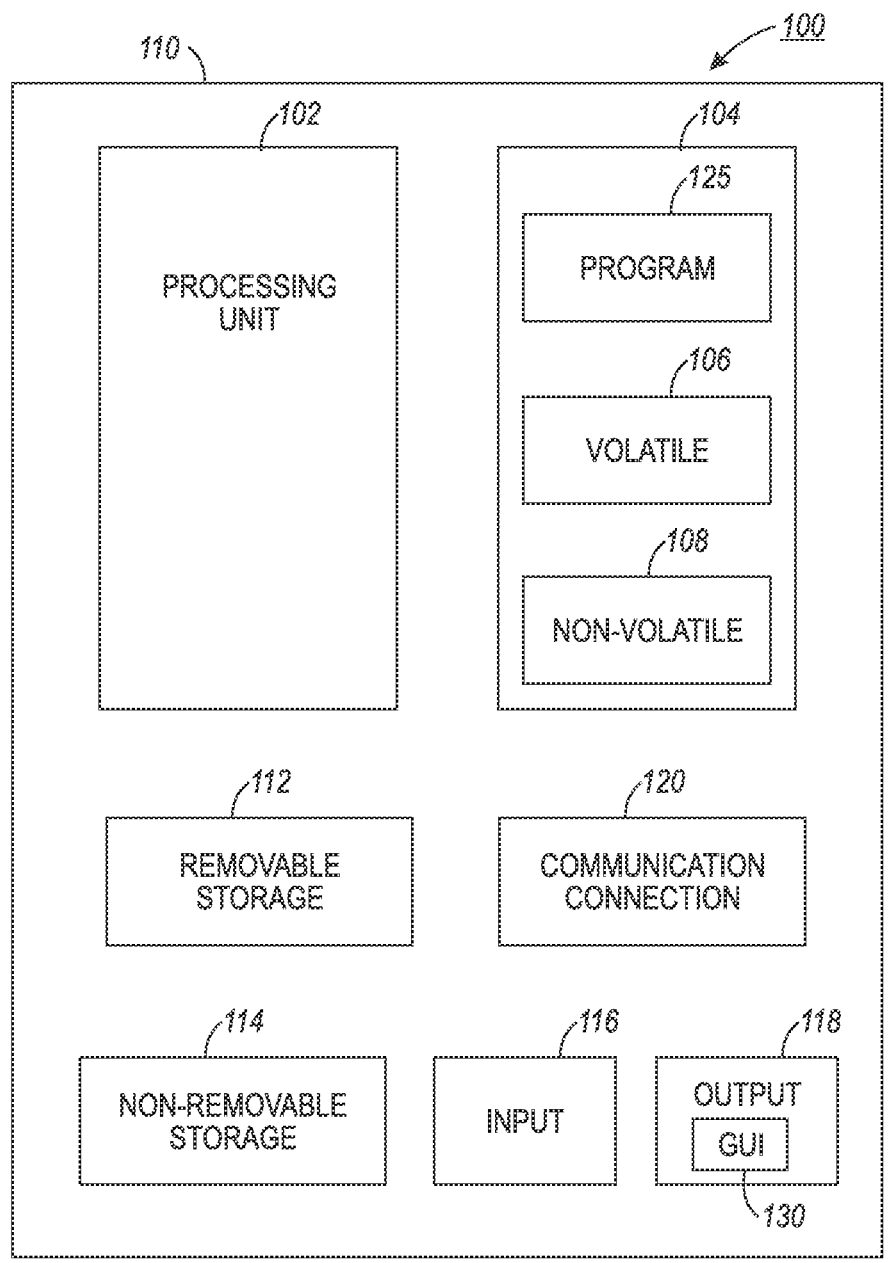
FIG. 1 depicts a block diagram of a computer system which is implemented in accordance with the disclosed embodiments.
Figure 2:
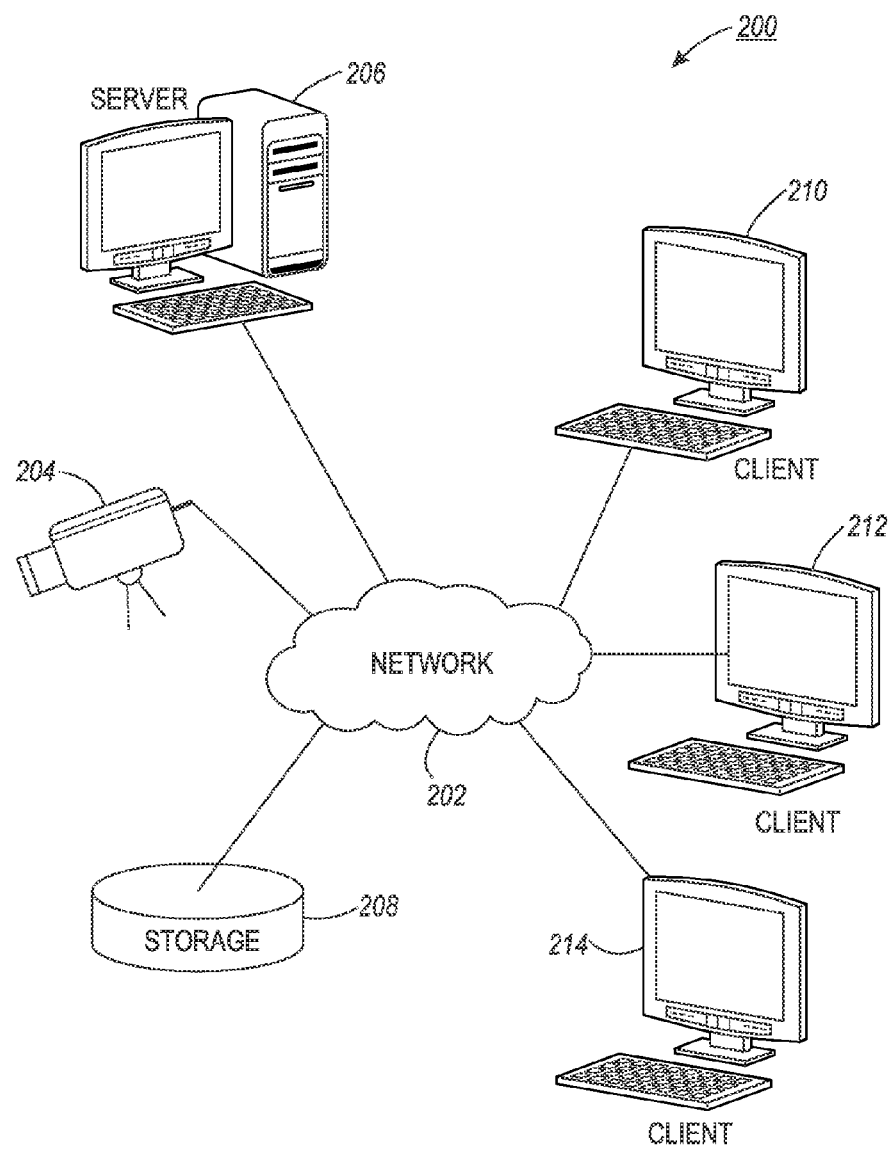
FIG. 2 depicts a graphical representation of a network of data-processing devices in which aspects of the present invention may be implemented.
Figure 3:
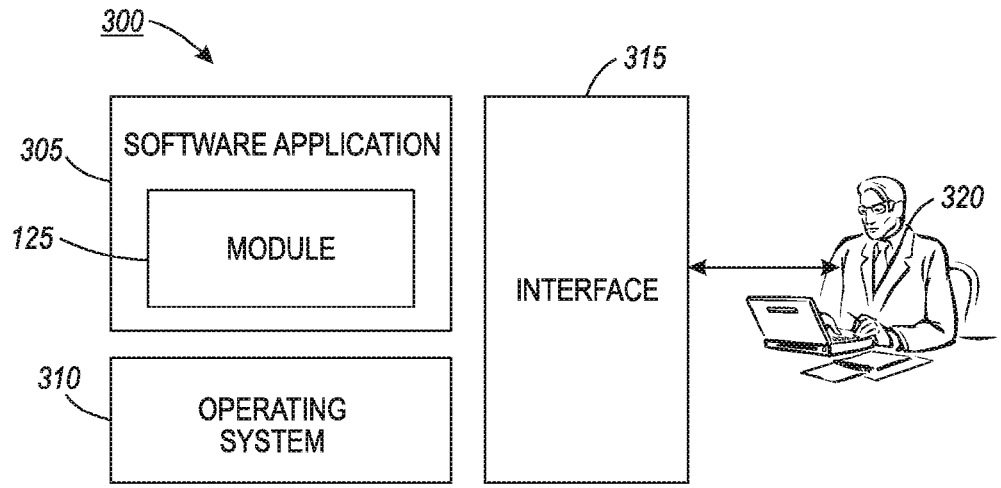
FIG. 3 illustrates a computer software system for directing the operation of the data-processing system depicted in FIG. 1, in accordance with an example embodiment.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing the methods and systems disclosed herein is shown in FIG. 1. A general computing device in the form of a computer 110 may include a processing unit 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data, including data comprising frames of video.

Computer 110 may include or have access to a computing environment that includes input 116, output 118, and a communication connection 120. The computer may operate in a networked environment using a communication connection to connect to one or more remote computers or devices. The remote computer may include a personal computer (PC), server, router, network PC, a peer device or other common network node, or the like. The remote device may include a photographic camera, video camera, tracking device, or the like. The communication connection may include a Local Area Network (LAN), a Wide Area Network (WAN) or other networks. This functionality is described in more fully in the description associated with FIG. 2 below.

Output 118 is most commonly provided as a computer monitor, but may include any computer output device. Output 118 may also include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse, and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module 125, which can be representative of other modules described herein, are stored on a computer-readable medium and are executable by the processing unit 102 of computer 110. Program module 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present invention may be implemented. Network data-processing system 200 is a network of computers in which embodiments of the present invention may be implemented. Note that the system 200 can be implemented in the context of a software module such as program module 125. The system 200 includes a network 202 in communication with one or more clients 210, 212, and 214. Network 202 is a medium that can be used to provide communications links between various devices and computers connected together within a networked data processing system such as computer system 100. Network 202 may include connections such as wired communication links, wireless communication links, or fiber optic cables. Network 202 can further communicate with one or more servers 206, one or more external devices such as video camera 204, and a memory storage unit such as, for example, memory or database 208.

In the depicted example, video camera 204 and server 206 connect to network 202 along with storage unit 208. In addition, clients 210, 212, and 214 connect to network 202. These clients 210, 212, and 214 may be, for example, personal computers or network computers. Computer system 100 depicted in FIG. 1 can be, for example, a client such as client 210, 212, and/or 214. Alternatively clients 210, 212, and 214 may also be, for example, a photographic camera, video camera, tracking device, etc.

Computer system 100 can also be implemented as a server such as server 206, depending upon design considerations. In the depicted example, server 206 provides data such as boot files, operating system images, applications, and application updates to clients 210, 212, and 214, and/or to video camera 204. Clients 210, 212, and 214 and video camera 204 are clients to server 206 in this example. Network data-processing system 200 may include additional servers, clients, and other devices not shown. Specifically, clients may connect to any member of a network of servers, which provide equivalent content.

In the depicted example embodiment, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations of the disclosed embodiments.

FIG. 3 illustrates a computer software system 300, which may be employed for directing the operation of the data-processing systems such as computer system 100 depicted in FIG. 1. Software application 305, may be stored in memory 104, on removable storage 112, or on non-removable storage 114 shown in FIG. 1, and generally includes and/or is associated with a kernel or operating system 310 and a shell or interface 315. One or more application programs, such as module(s) 125, may be "loaded" (i.e., transferred from removable storage 114 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, mini-computers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of a data-processing system such as computer system 100, in conjunction with program module 125, and data-processing system 200 and network 202 depicted in FIGS. 1-3. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Macintosh, UNIX, LINUX, and the like. Therefore, the descriptions of the exemplary embodiments, which follow, are for purposes of illustration and not considered a limitation.

It is common in various applications for video cameras to capture cross street video of a roadway. In some cases, this video is collected in order to determine the parking occupancy of the street. A parked vehicle usually occludes the curb. The present invention takes advantage of a combination of detection techniques, which provide a computationally efficient yet robust video-based method and system for identifying a visible curb in a region of interest in order to estimate the parking availability in the region of interest. Such methods and systems are particularly valuable in situations, as suggested above, where cross street video data is being collected. This includes scenarios involving parking lots, stop-and-go traffic scenarios, entrances and exits to an environment, pedestrian traffic thoroughfares, toll booths, roads, highways, intersections, bridges, tunnels, and the like.

Figure 4:
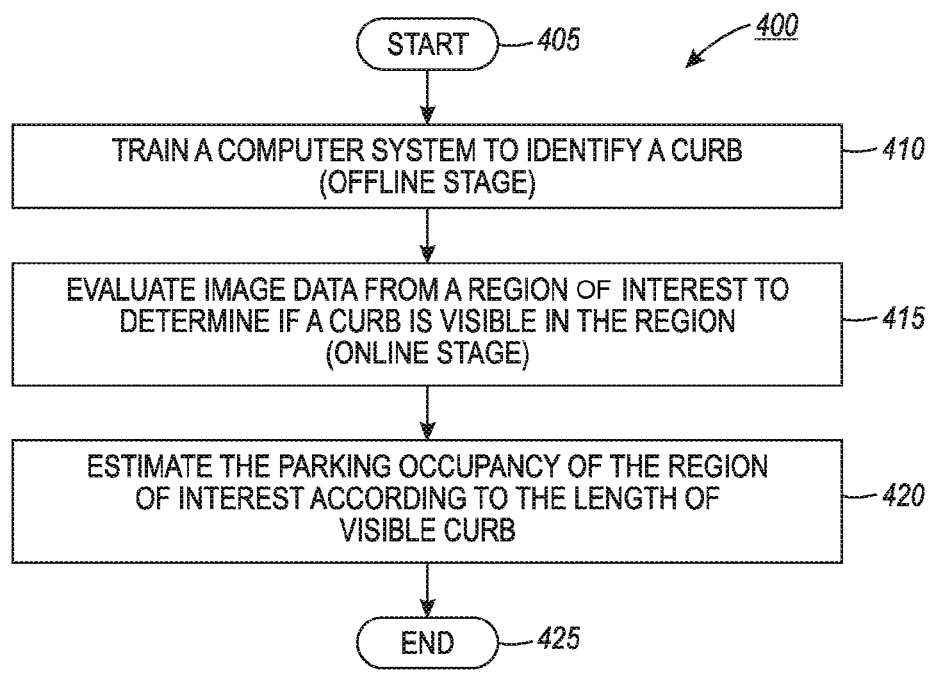
FIG. 4 depicts a high-level flow chart illustrating logical operational steps for estimating on-street parking occupancy in accordance with the disclosed embodiments.

FIG. 4 illustrates a high level flow chart 400 of logical operational steps associated with methods and systems for estimating parking occupancy via curb detection. The method begins at step 405. In general, method 400 includes an online stage and an offline stage. Offline stage is illustrated at step 410. The phrase "offline" as used herein means that the step or steps described are not processed in real-time (or in operational phase) and can be performed in preparation for "online" (or real-time) steps. In step 410, a computer system such as computer system 100 can be trained to identify a curb. Step 410 can include a number of sub-steps which can include defining a region of interest, collecting a set of images of the region of interest under various conditions such as varying weather conditions, illumination conditions, different times of day, etc., clustering such images into groups indicative of those conditions, and then training one or more classifiers for each group of training images. It should be appreciated that alternatively, one classifier can be trained for all the images embodying the varying conditions. Step 410 is preferably conducted using the same camera with the same camera settings for all the conditions. However, training data can be collected by multiple cameras from multiple vantages if necessary.

A classifier, as described herein, describes a machine learning tool that can be thought of as a computer program that employs an algorithm to classify data as having or not having some quality or qualities. For example, in the present case, a classifier could be a program that is provided input of video data where some known condition exists. This condition could be related to the visual characteristics of a curb. Sample video data wherein a curb is visible can be provided to the classifier, and machine learning techniques can be used so that the classifier is trained to identify characteristics of a curb. The classifier can then be applied to video data where the presence of a curb is not predetermined. The classifier can draw on the learning provided during the training stage to determine (or classify) a specific portion of a video frame as including or not including a curb.

The "online" stage can be performed as shown at step 415. Generally, step 415 comprises evaluating image data from the region of interest to determine if a curb is visible in the region. Step 415 is conducted "online" which means the step and associated sub-steps can be performed at or near real time. These steps may alternatively be performed offline, if desired. In addition, step 415 can be processed for each frame of incoming video data, frame by frame.

Figure 5:
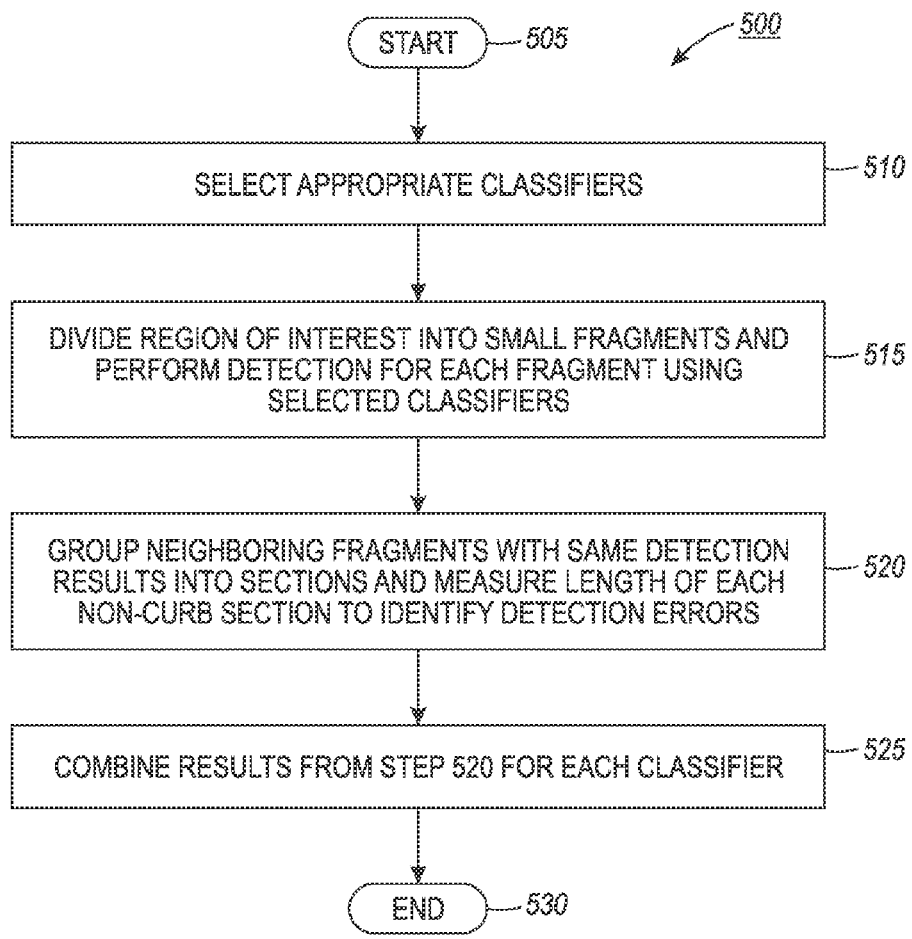
FIG. 5 depicts a flow chart illustrating alternative logical operational steps associated with determining if a curb is visible in an image in accordance with the disclosed embodiments.

Step 415 is described in more detail in FIG. 5, which begins at step 505. As shown at step 510, appropriate classifiers are selected. Determining the appropriate classifiers requires consideration of a number of factors such as the current time of day, the current illumination conditions, current weather, etc. At step 510, more than one classifier can be selected for the given conditions. For example, on a rainy day at night, classifiers for the time of day (i.e. night) and the weather condition (i.e. rainy) can be selected. In a preferred embodiment, any number of applicable classifiers can be selected for a given set of conditions.

Step 515 illustrates that a region of interest in the collected video data can be divided into a set of fragments. For each fragment, a classifier or set of classifiers can be applied to determine whether the fragments include a curb or do not include a curb. In one embodiment, for each video frame, for the i-th fragment using the j-th classifier a detection result $R_{ij}$ (indicating "curb" or "no curb") and an associated confidence score $S_{ij}$ can be determined.

Confidence score $S_{ij}$ is an output of the j-th classifier for the i-th fragment and is indicative of how likely the i-th fragment contains a curb. The classical classifiers in machine learning (e.g., support vector machine, neural networks, etc.) typically provide this score inherently after performing the training in the offline phase. If $S_{ij}$ is a high positive value, it means that the i-th fragment is very likely to include a curb and similarly if $S_{ij}$ is a high negative value, it is very unlikely to include a curb according to the j-th classifier. The classification decision is typically made by thresholding the confidence score with a pre-determined threshold. Based on the score being larger or smaller than the pre-determined threshold, the fragment is identified as including or not including the curb by the classifier.

In one embodiment, the classifiers used in step 515 can be implemented using template matching wherein a set of templates for different time and weather/illumination conditions are applied. Alternatively, the classifiers can use a set of features extracted from each fragment. For example, a classifier for curb detection can use properties of the lines detected in small fragments of the video frames and curbs therein. Such properties can include orientation, length, and position of the lines detected in the fragments. The classifier can use the features extracted from the line detected for each fragment and then assign a confidence score, such as $S_{ij}$, that is indicative of the confidence that the fragment includes a visible portion of a curb.

At step 520 neighboring fragments with the same detection results (i.e. "curb" or "no curb") can be grouped into sections. This can be performed for each classifier. The length of each section that does not contain a curb is then measured. If the length of the section that does not contain a curb is too short (i.e. shorter than a pre-determined threshold such as the length of a vehicle), the section and associated fragments are re-classified as including a curb. This step corrects small misdetections and can also affect the confidence score $S_{ij}$ associated with the fragments. Thus, if one fragment does not provide an affirmative detection result $R_{ij}$ but all neighboring fragments do, then the fragment can be reassigned an affirmative detection result $R_{ij}$ but the confidence score $S_{ij}$ will decrease. The pre-determined threshold can be adjusted to correspond to a minimum length of a vehicle and may require some spatial variance correction in order to account for differences in the appearance of vehicle length that results from the perspective of the camera.

Finally, the results from step 520 can be combined for each classifier at step 525. This can be accomplished using any one of many known methods for combining the results of one or more classifiers. After calculating confidence scores for each classifier used on a given fragment, in one embodiment, the detection result $R_{ij}$ associated with the highest confidence score can be considered the combined results and can be compared with a pre-determined threshold to classify the fragment. In another embodiment, for example, an average confidence score can be calculated by averaging the confidence scores of all the classifiers. This average confidence score is then compared with a pre-determined threshold to determine the classification of the fragment (i.e., including or not including curb). In yet another embodiment, majority voting can be performed on final decisions of the classifiers. The method of FIG. 5 then ends at step 530.

Upon completion of step 415, a detection result indicative of the length of visible curb in a region of interest is provided. This length can then be used as illustrated at step 420 to estimate the parking occupancy of the region of interest. For example, from step 415, the computer system can provide a total length of visible curb in the region of interest, or can provide the length of visible curb for each of a number of sections in the region of interest. These length(s) can then be divided by, for example, the average length of a vehicle, or other predetermined length. The result is a number indicative of the total number of available parking spaces in the region of interest. Alternatively, the total length of the visible curb can be subtracted from the total length of the curb in the region of interest. This number is indicative of the total non-visible curb. This number can be divided by, for example, the average length of a vehicle, or other predetermined length. This result is indicative of how many vehicles are parked (parking occupancy) in the region of interest. The method 400 ends at step 425.

Figure 6:
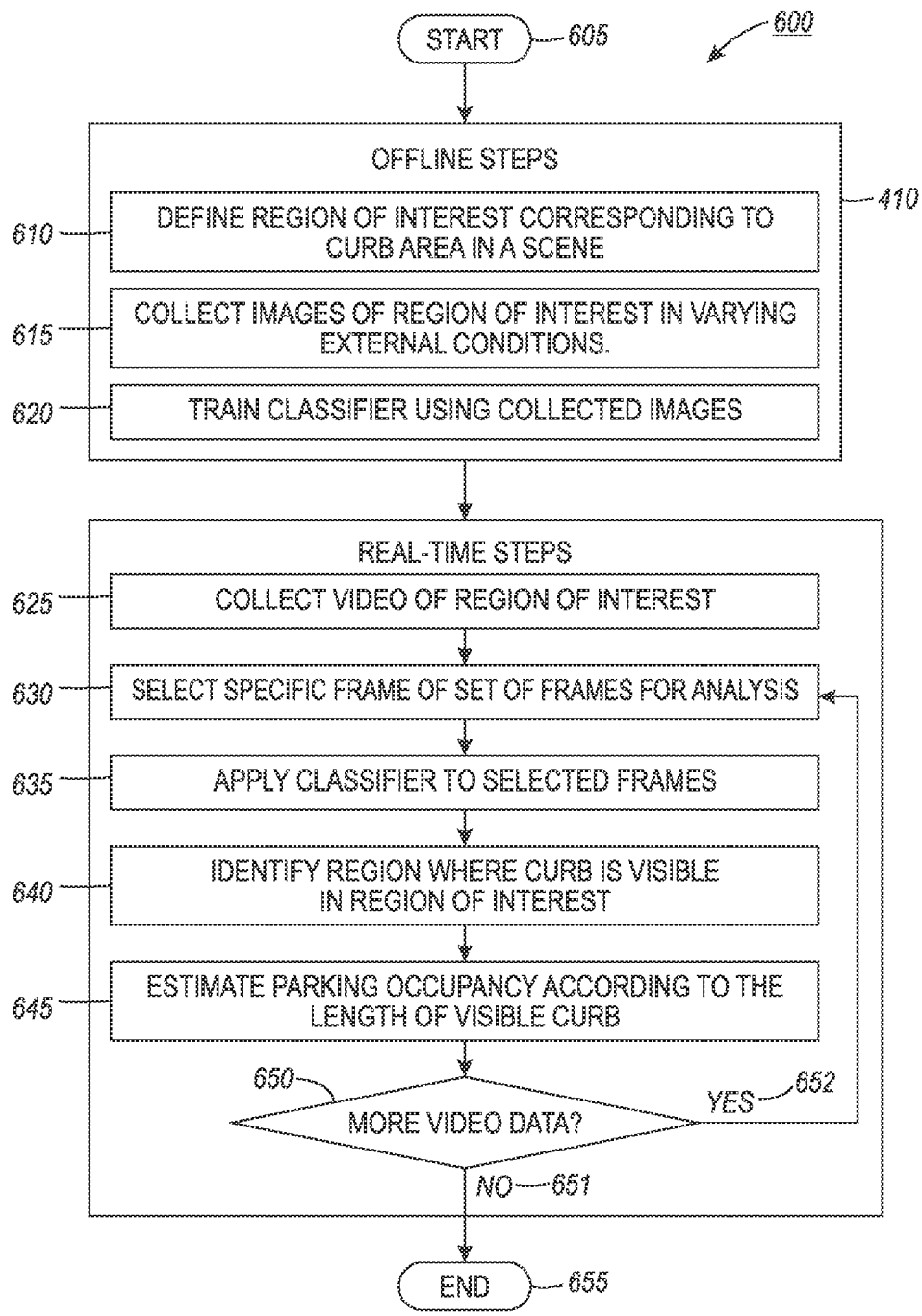
FIG. 6 depicts a detailed flow chart illustrating logical operational steps for estimating on-street parking occupancy in accordance with an alternative disclosed embodiment.

FIG. 6 illustrates steps associated with a method 600 which can be implemented by a computer such as computer system 100 in accordance with one alternative embodiment of the invention. This method begins at step 605. Method 600 is characterized by reliance on a single classifier trained using a collection of images from a region of interest, wherein the images are indicative of a variety of external conditions.

A region of interest can be defined as shown at step 610. The region of interest preferably corresponds to a street that includes a curb. In addition, the region of interest for offline steps 610-620 is preferably the same region that will be subject to the real-time steps 625-652, discussed below. Once a region of interest has been defined, images of the region of interest can be collected in a variety of different conditions as described at step 615. For example, image data of the region, during the day, at night, at dawn and dusk, in snow, in rain, with cloud cover, with direct sun exposure, with high and low vehicle traffic, with high and low pedestrian traffic, etc., can be collected.

A single classifier can then be trained at 620 using all the various images of the region under the various external conditions. Training the classifier with diverse external conditions improves the classifier robustness when it is deployed in real-time curb detection scenarios.

The real-time application of the classifier can then begin. At step 625, video data of the region of interest can be collected. In a preferred embodiment, this video data is collected by the same camera used to collect the training data in step 615 above. The real-time video data from the video camera will generally be comprised of a set of video frames. At step 630, a specific video frame from the video data is collected. This video frame can be, for example, the first video frame of the incoming video data, or can be selected to correspond to a specific time at which a determination of vehicle occupancy in the scene of interest is desired.

The classifier trained in step 620 can then be applied to the selected video frame at step 635. The classifier is used to identify a section or sections in the video frame where the curb is visible in the region of interest as shown at 640. The length of visible curb can then be used to estimate the parking occupancy of the region of interest as illustrated at step 645.

It should be appreciated that all of steps 625-645 can be computed at or near real-time if desired. In this way, the current parking occupancy of the region of interest can be monitored. The next step can include a check if more video data has been provided to computer system 100, as described at step 650. If more video data is incoming as indicated by "yes" step 652, the method can iteratively cycle back to step 630 wherein a new frame of the incoming video data is selected for analysis. If no more video data has been provided as indicated by "no" step 651, the method ends at step 655.

Figure 7:
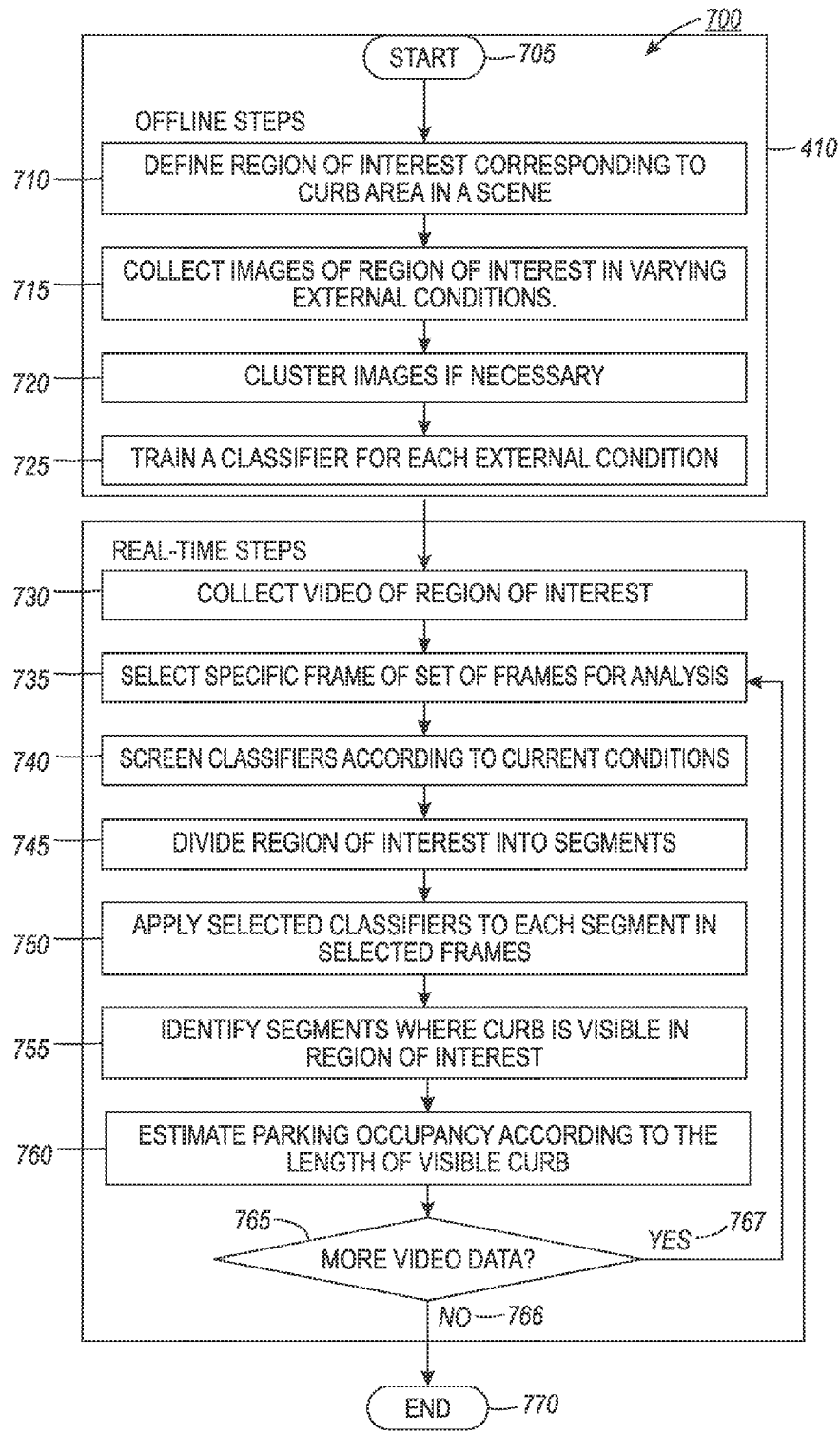
FIG. 7 depicts a detailed flow chart illustrating logical operational steps for an alternative method of estimating on-street parking occupancy in accordance with an alternative disclosed embodiment.

FIG. 7 illustrates another alternative embodiment of the invention 700, wherein multiple classifiers are trained and applied, as opposed to a single classifier as shown in method 600. The method 700 starts at step 705.

As in FIG. 6, in the first offline step of method 700, a region of interest can be defined at step 710. The region of interest preferably corresponds to a street that includes a curb. Video data comprising a collection of video frames or images of the region of interest can be collected in varying external conditions as illustrated at step 715. The next step is to cluster these images according to the external conditions under which they were collected. Clustering images is associated with methods for training multiple classifiers. Generally, the video collected for training a classifier is collected continuously or semi-continuously in an effort to collect video of the region of interest under a variety of conditions. Clustering is used to match like conditions so that a classifier can be trained for that specific external condition. For example, all video data collected at night could be clustered so that one classifier could be trained at night. Likewise, a day classifier, rainy classifier, heavy traffic classifier, morning classifier, evening classifier, etc., could be trained by clustering all video data collected under that respective condition. As step 725 suggests, the clustered video data can then be used to train a classifier for each of a plurality of external conditions.

The real-time implementation of the classifiers begins at step 730 wherein video of the region of interest can be collected as in step 625 above. It should be appreciated that in the absence of video data still image data could alternatively be used. At step 735, a specific frame or set of frames can be selected for analysis.

At this point, the real time steps of method 700 diverge from that of method 600 above. Here at step 740, the plurality of classifiers trained at step 725 can be screened to match with the current external conditions. For example, if the current conditions are a sunny day in February at 2:00 PM, a selection of classifiers for sunny, February, and 2:00 PM can be selected from the group of classifiers.

The region of interest is then divided into fragments at step 745 and the selected classifiers are applied to each fragment in the selected frames at step 750. This process mirrors that described above in FIG. 4 as step 415, which is detailed more thoroughly in FIG. 5. Segments of the region of interest where the curb is visible (or alternatively where the curb is not visible) can be identified by applying the classifiers as shown at block step 755. The length of curb detected can then be used to estimate the parking occupancy in the region of interest at step 760.

As in FIG. 6, all of steps 730-760 can be computed at or near real-time if desired so that the current parking occupancy of the region of interest can be monitored. The next step can include a check if more video data has been provided to computer system 100, as described at step 765. If more video data is incoming as indicated by "yes" step 767, the method can iteratively cycle back to step 735 wherein a new frame of the incoming video data is selected for analysis. If no more video data has been provided as indicated by "no" step 766, the method ends at step 770.

Figure 8:
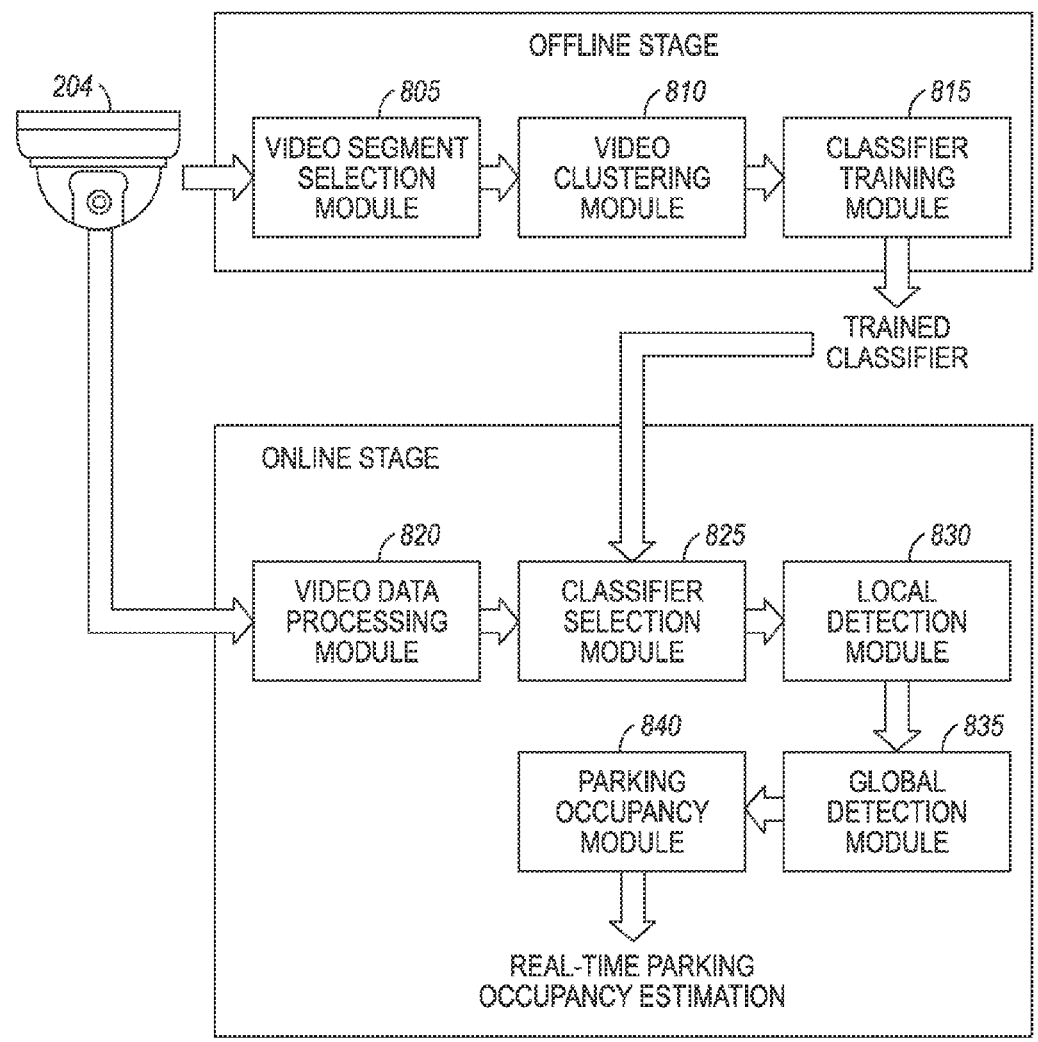
FIG. 8 depicts modules associated with a system for estimating on-street parking occupancy in accordance with the disclosed embodiments.

FIG. 8 illustrates a block diagram of modules associated with a system and method for estimating vehicle occupancy via curb detection. These modules may comprise hardware and/or software associated with a computer system such as computer system 100 and can be implemented using both the computer system 100 and/or the network 200. A video acquisition module 204 is used to monitor a scene of interest. Video acquisition module 204 can be any type of video or other such surveillance device. Alternatively, video acquisition module 204 can comprise previously captured video stored as data in memory such as memory 104, removable storage 112, or non-removable storage 114.

Video acquisition module 204 provides data to video segment selection module 805. Video segment selection module 805 is used to select a segment of video data to evaluate for curb detection and vehicle occupancy. The selected segments of video data are then provided to video clustering module 810 if necessary, and then to classifier training module 815. Classifier training module 815 generally performs step 410 of FIG. 4. The classifier training module 815 is generally configured to output at least one and perhaps many trained classifiers for implementation in real time applications.

The online or real-time section of the system can include a video data processing module 820 for taking video data from video acquisition module 204 and selecting specific frames of the video data for analysis. If more than one classifier is provided from classifier training module 815, classifier selection module 825 can be used to select one or more classifiers to apply to the video data according to the external conditions associated with that video data. Local detection module 830 generally divides the region of interest into fragments and applies the selected classifiers to the fragments to produce a detection result. The global detection module 835 then combines the detection results from the local detection module to provide a length of curb detected (or alternatively curb not detected) in the region of interest. The parking occupancy module 840 is then used to compute a real-time parking occupancy estimation according to the length of the detected curb in the region of interest.

Figure 9:
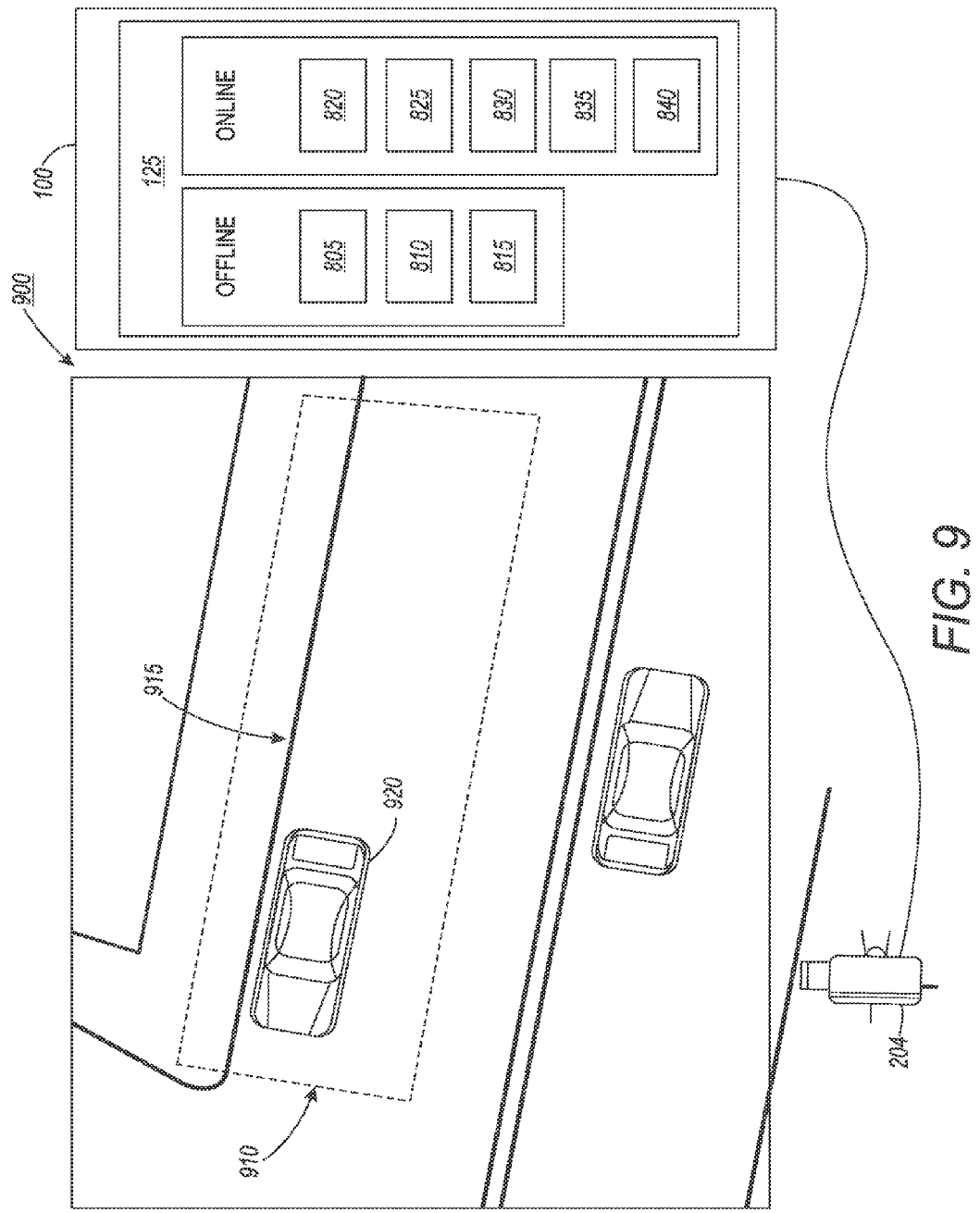
FIG. 9 depicts a system for estimating on-street parking occupancy in accordance with the disclosed embodiments.

FIG. 9 illustrates a system 900 for on-street vehicle occupancy via curb detection. In an example embodiment, the system 900 can be deployed in an environment such as along a street, as shown in FIG. 9. The environment may also be any other environment where video surveillance is performed and preferably in an environment wherein a curb is visible. The example of a street shown in FIG. 9 is provided solely as an example and not intended to limit the scope of the disclosed embodiments.

Within the environment, a vehicle 920 may be present on a roadway, in an intersection, in a parking facility, or any other such environment. The vehicle 920 is illustrated in FIG. 9 as parked in a region of interest 910 along a curb 915. Video acquisition module 204, herein shown as a video camera, collects video data of the region of interest 910. It should be appreciated that the video data of the region of interest 910 may be continuously collected, or alternatively, video acquisition may be triggered on an interval or when a vehicle enters the area of interest 910, or under other known triggering conditions. Furthermore, video acquisition module 204 may save video data in a database and associated data structure such as a database stored in memory 104 of computer system 100.

Video camera 204 may be operably connected with a computer system 100 and/or network 200 as illustrated in FIGS. 1 and 2. In FIG. 9, computer system 100 is shown with a number of associated modules used to implement the processing steps and/or modules shown in FIGS. 4-7.

Video camera 204 collects video data of the vehicle 920 and curb 915 and transmits that data to computer system 100 and to video segment selection module 805. In video segment selection module 805, a segment of the video is selected for analysis. That segment of video data is provided to video clustering module 810, and then classifier training module 815 in an offline operation to train one or more classifiers.

The trained classifier(s) is then provided to a classifier selection module in the online stage of implementation. Here, video data from video camera 204 is processed by video data processing module 820. Classifier selection module 825 then selects the appropriate one or more classifiers to apply to the video data according to the external conditions associated with the video data. The local detection module 830 generally divides the region of interest into fragments and applies the selected classifiers to the fragments to produce a detection result. The global detection module 835 can then combine the detection results from the local detection module to provide a length of curb detected (or alternatively curb not detected) in the region of interest. The parking occupancy module 840 can be then used to compute a real-time parking occupancy estimation according to the length of the detected curb in the region of interest.

Based on the foregoing, it can be appreciated that a number of embodiments, preferred and alternative, are disclosed herein. For example, in one embodiment, a method for identifying a curb comprises training a computer system to identify a curb, evaluating image data of a region of interest to determine a region wherein a curb is visible in the region of interest, and estimating a parking occupancy of the region of interest according to the region where the curb is visible.

Training the computer system to identify a curb further comprises collecting data from said scene of interest, clustering the collected data into groups representative of a selected condition, and training at least one classifier for each of the groups. Evaluating image data of the region of interest to determine a region wherein the curb is visible further comprises selecting a plurality of classifiers from the at least one classifier for each of the groups, applying the plurality of classifiers to the region of interest to identify regions wherein the curb is visible, and then combining results from the plurality of classifiers.

In one embodiment, the image data comprises at least one of a still photo, a frame of video data, and a plurality of frames of video data. Combining results from the plurality of classifiers comprises at least one of averaging all of said results from said plurality of classifiers and comparing said average to a predefined threshold, comparing each of the results from the plurality of classifiers to a predefined threshold for each of the classifiers, and performing majority voting on the results from the plurality of classifiers.

In another example embodiment, estimating a parking occupancy of the region of interest according to the region where the curb is visible can further includes determining a length of the region where the curb is visible; and dividing the length by a predefined length to determine the number of available parking spaces.

In another example embodiment, evaluating the image data of a region of interest to determine a region wherein a curb is visible in the region of interest, and estimating a parking occupancy of the region of interest according to said region where said curb is visible can be accomplished in real time.

In another example embodiment, a method for estimating parking occupancy can include collecting data from a scene of interest, clustering the collected data into groups representative of a selected condition, training at least one classifier for each of the groups to identify a curb, evaluating image data of a region of interest to determine a region wherein a curb is visible in the region of interest, and estimating a parking occupancy of the region of interest according to the region where the curb is visible.

In another example embodiment, evaluating image data of the region of interest to determine a region wherein the curb is visible can further include or involve selecting a plurality of classifiers from the at least one classifier for each of the groups, applying the plurality of classifiers to the region of interest to identify regions wherein the curb is visible, and combining results from the plurality of classifiers.

In yet another embodiment, the image data comprises at least one of a still photo, a frame of video data, and a plurality of frames of video data. Combining results from the plurality of classifiers comprises at least one of averaging all of the results from the plurality of classifiers and comparing the average to a predefined threshold; comparing each of the results from the plurality of classifiers to a predefined threshold for each of the classifiers; and performing majority voting on the results from the plurality of classifiers.

In another example embodiment, estimating parking occupancy of the region of interest according to the region where the curb is visible can further include determining a length of said region where the curb is visible, and dividing the length by a predefined length to determine the number of available parking spaces. The steps or operations of evaluating image data of a region of interest to determine a region wherein a curb is visible in the region of interest, and estimating a parking occupancy of the region of interest according to the region where the curb is visible can be accomplished in real-time.

In yet another embodiment, a system for curb detection and parking occupancy estimation comprises a camera configured to collect image data; a processor; and a computer-usable medium embodying computer code, the computer-usable medium being coupled to the processor, the computer code comprising non-transitory instruction media executable by said processor configured for training a computer system to identify a curb; evaluating image data of a region of interest to determine a region wherein a curb is visible in the region of interest; and estimating a parking occupancy of the region of interest according to the region where the curb is visible.

In an alternative embodiment, the computer code comprising non-transitory instruction media executable by the processor configured for training the computer system to identify a curb further comprises collecting data from said scene of interest, clustering said collected data into groups representative of a selected condition, and training at least one classifier for each of said groups.

The system wherein the computer code comprises non-transitory instruction media executable by the processor configured for evaluating image data of the region of interest to determine a region wherein the curb is visible can further comprise in an alternative embodiment, selecting a plurality of classifiers from the at least one classifier for each of said groups; applying the plurality of classifiers to the region of interest to identify regions wherein the curb is visible; and combining results from the plurality of classifiers.

In an alternative embodiment, the image data comprises at least one of a still photo, a frame of video data, and a plurality of frames of video data.

In another example embodiment, the computer code comprising non-transitory instruction media executable by the processor configured for combining results from the plurality of classifiers, can include one or more of the following: averaging all of the results from the plurality of classifiers and comparing the average to a predefined threshold; comparing each of the results from the plurality of classifiers to a predefined threshold for each of the classifiers; and performing majority voting on the results from the plurality of classifiers.

In yet another embodiment, the computer code comprising non-transitory instruction media executable by the processor can be configured for estimating a parking occupancy of the region of interest according to the region where the curb is visible further comprises determining a length of the region where the curb is visible and dividing the length by a predefined length to determine a number of available parking spaces.

In another example embodiment, the computer code comprising non-transitory instruction media executable by said processor can be configured for evaluating image data of a region of interest to determine a region wherein a curb is visible in the region of interest, and estimating a parking occupancy of the region of interest according to the region where the curb is visible and can be accomplished in real time.

It will be appreciated that variations of the above-disclosed and other features and functions, or alternatives thereof, may be desirably combined into many other different systems or applications. It will also be appreciated, that various presently unforeseen or unanticipated alternatives, modifications, variations or improvements therein may be subsequently made by those skilled in the art, which are also intended to be encompassed by the following claims.

What is claimed is:

1. A method comprising:
   training a computer system to identify a curb;
   evaluating image data of a region of interest to determine a region wherein a curb is visible in said region of interest, said evaluation further comprising:
      determining a length of said region where said curb is visible;
      dividing said length by a predefined length to determine a number of available parking spaces; and
   estimating a parking occupancy of said region of interest according to said region where said curb is visible.

2. The method of claim 1 wherein training said computer system to identify a curb further comprises:
   collecting data from said scene of interest;
   clustering said collected data into groups representative of a selected condition; and
   training at least one classifier for each of said groups.

3. The method of claim 2 wherein evaluating image data of said region of interest to determine a region wherein said curb is visible further comprises:
   selecting a plurality of classifiers from said at least one classifier for each of said groups;
   applying said plurality of classifiers to said region of interest to identify regions wherein said curb is visible; and
   combining results from said plurality of classifiers.

4. The method of claim 3 wherein said image data comprises at least one of:
   a still photo;
   a frame of video data; and
   a plurality of frames of video data.

5. The method of claim 3 wherein combining results from said plurality of classifiers comprises at least one of:
   averaging all of said results from said plurality of classifiers and comparing said average to a predefined threshold;
   comparing each of said results from said plurality of classifiers to a predefined threshold for each of said classifiers; and
   performing majority voting on said results from said plurality of classifiers.

6. The method of claim 1 wherein said steps of evaluating image data of a region of interest to determine a region wherein a curb is visible in said region of interest and estimating a parking occupancy of said region of interest according to said region where said curb is visible is done in real-time.

7. A method comprising:
   collecting data from a scene of interest;
   clustering said collected data into groups representative of a selected condition;
   training at least one classifier for each of said groups to identify a curb;
   evaluating image data of a region of interest to determine a region wherein a curb is visible in said region of interest, said evaluation further comprising:
      determining a length of said region where said curb is visible;
      dividing said length by a predefined length to determine a number of available parking spaces; and
   estimating a parking occupancy of said region of interest according to said region where said curb is visible.

8. The method of claim 7 wherein evaluating image data of said region of interest to determine a region wherein said curb is visible further comprises:
   selecting a plurality of classifiers from said at least one classifier for each of said groups;
   applying said plurality of classifiers to said region of interest to identify regions wherein said curb is visible; and
   combining results from said plurality of classifiers.

9. The method of claim 8 wherein said image data comprises at least one of:
   a still photo;
   a frame of video data; and
   a plurality of frames of video data.

10. The method of claim 8 wherein combining results from said plurality of classifiers comprises at least one of:
    averaging all of said results from said plurality of classifiers and comparing said average to a predefined threshold;
    comparing each of said results from said plurality of classifiers to a predefined threshold for each of said plurality of classifiers; and
    performing majority voting on said results from said plurality of classifiers.

11. The method of claim 7 wherein said steps of evaluating image data of a region of interest to determine a region wherein a curb is visible in said region of interest, and estimating a parking occupancy of said region of interest according to said region where said curb is visible is done in real-time.

12. A system comprising:
    a camera configured to collect image data;
    a processor; and
    a computer-usable medium embodying computer code, said computer-usable medium being coupled to said processor, said computer code comprising non-transitory instruction media executable by said processor configured for:
       training a computer system to identify a curb;
       evaluating image data of a region of interest to determine a region wherein a curb is visible in said region of interest, said evaluation further comprising:
          determining a length of said region where said curb is visible;
          dividing said length by a predefined length to determine a number of available parking spaces; and
       estimating a parking occupancy of said region of interest according to said region where said curb is visible.

13. The system of claim 12 wherein said computer code comprising non-transitory instruction media executable by said processor configured for training said computer system to identify a curb further comprises:
    collecting data from said scene of interest;
    clustering said collected data into groups representative of a selected condition; and
    training at least one classifier for each of said groups.

14. The system of claim 13 wherein said computer code comprising non-transitory instruction media executable by said processor configured for evaluating image data of said region of interest to determine a region wherein said curb is visible further comprises:
    selecting a plurality of classifiers from said at least one classifier for each of said groups;
    applying said plurality of classifiers to said region of interest to identify regions wherein said curb is visible; and
    combining results from said plurality of classifiers.

15. The system of claim 14 wherein said image data comprises at least one of:
    a still photo;
    a frame of video data; and
    a plurality of frames of video data.

16. The system of claim 14 wherein said computer code comprising non-transitory instruction media executable by said processor configured for combining results from said plurality of classifiers comprises at least one of:
- averaging all of said results from said plurality of classifiers and comparing said average to a predefined threshold;
- comparing each of said results from said plurality of classifiers to a predefined threshold for each of said classifiers; and
- performing majority voting on said results from said plurality of classifiers.

17. The system of claim 12 wherein said computer code comprising non-transitory instruction media executable by said processor configured for said steps of evaluating image data of a region of interest to determine a region wherein a curb is visible in said region of interest and estimating a parking occupancy of said region of interest according to said region where said curb is visible is done in real-time.

* * * * *